United States Patent
Kataoka et al.

(10) Patent No.: US 11,060,664 B2
(45) Date of Patent: Jul. 13, 2021

(54) PRESSURE CONTAINER

(71) Applicant: KOBE STEEL, LTD., Hyogo (JP)

(72) Inventors: Yasuto Kataoka, Hyogo (JP);
Hirokazu Shukuin, Hyogo (JP);
Kazuya Hirata, Hyogo (JP)

(73) Assignee: KOBE STEEL, LTD., Hyogo (JP)

(*) Notice: Subject to any disclaimer, the term of this patent is extended or adjusted under 35 U.S.C. 154(b) by 0 days.

(21) Appl. No.: 16/477,132

(22) PCT Filed: Dec. 14, 2017

(86) PCT No.: PCT/JP2017/044985
§ 371 (c)(1),
(2) Date: Jul. 10, 2019

(87) PCT Pub. No.: WO2018/131378
PCT Pub. Date: Jul. 19, 2018

(65) Prior Publication Data
US 2019/0360638 A1 Nov. 28, 2019

(30) Foreign Application Priority Data
Jan. 11, 2017 (JP) .............................. JP2017-002820

(51) Int. Cl.
*F17C 1/08* (2006.01)
*F16J 12/00* (2006.01)
*F17C 1/16* (2006.01)

(52) U.S. Cl.
CPC ............ *F17C 1/08* (2013.01); *F16J 12/00* (2013.01); *F17C 1/16* (2013.01); *F17C 2203/012* (2013.01); *F17C 2203/066* (2013.01)

(58) Field of Classification Search
CPC ...... F17C 1/08; F17C 1/16; F17C 2201/0166; F17C 2203/012; F17C 2201/0157; F16J 12/00
See application file for complete search history.

(56) References Cited

U.S. PATENT DOCUMENTS

| 2013/0048645 A1* | 2/2013 | Kataoka | ................ | F16J 12/00 |
| | | | | 220/581 |
| 2013/0048646 A1* | 2/2013 | Kataoka | ................ | F17C 1/02 |
| | | | | 220/581 |
| 2016/0377229 A1* | 12/2016 | Kataoka | ................ | F04B 39/06 |
| | | | | 220/592 |

FOREIGN PATENT DOCUMENTS

| JP | S51-142629 A | 12/1976 |
| JP | H05-32870 U | 4/1993 |

(Continued)

OTHER PUBLICATIONS

International Search Report issued in PCT/JP2017/044985; dated Mar. 20, 2018.

(Continued)

*Primary Examiner* — Don M Anderson
(74) *Attorney, Agent, or Firm* — Studebaker & Brackett PC

(57) ABSTRACT

A pressure vessel includes a vessel body, a first rib and a second rib. The vessel body includes a first surface and a second surface. The first rib projects in a second direction from the first surface and extends in a first direction. The second rib provided in series with the first rib, projects in the first direction from the second surface, and extends in the second direction. A width in the second direction of the internal space is smaller than a width in the first direction of the internal space. A maximum value of a projection amount of the second rib from the second surface to the outside of the vessel body in the first direction is smaller than the maximum value of a projection amount of the first rib from the first surface to the outside of the vessel body in the second direction.

8 Claims, 11 Drawing Sheets

(56) References Cited

FOREIGN PATENT DOCUMENTS

JP            2015-200373 A      11/2015
JP            2016-180488 A      10/2016
WO      WO-2015156049 A1 *  10/2015   .............. F04B 25/00

OTHER PUBLICATIONS

International Search Report; Written Opinion; and Notification of Transmittal of the International Search Report and the Written Opinion of the International Searching Authority, or the Declaration issued in PCT/JP2017/044985 ; dated Mar. 20, 2018.

* cited by examiner

FIG. 5
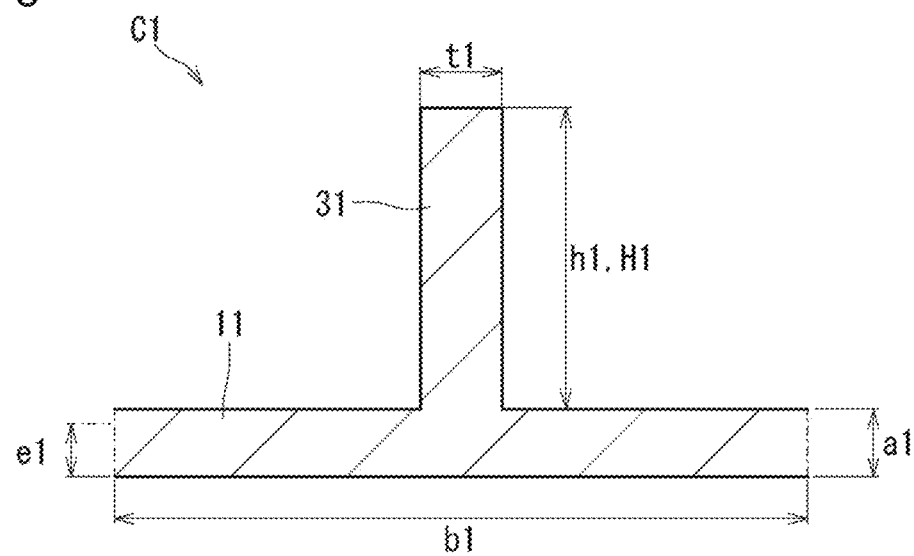
FIG. 6
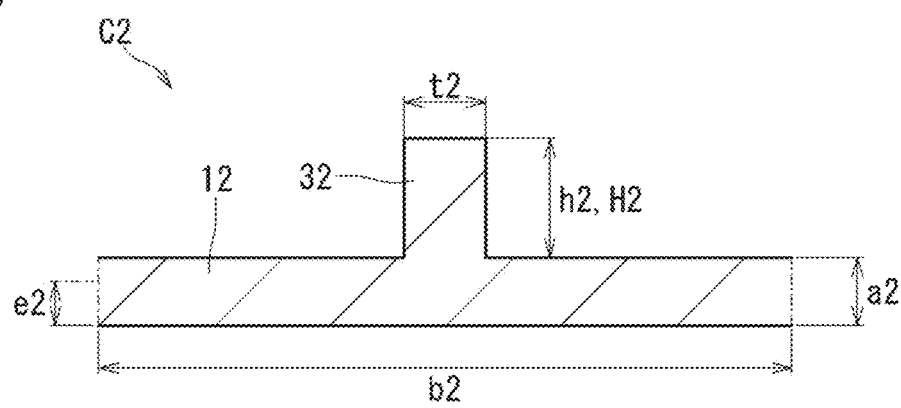
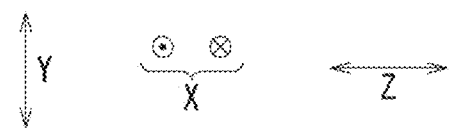

PRESSURE CONTAINER

TECHNICAL FIELD

The present invention relates to a pressure vessel.

BACKGROUND ART

A conventional pressure vessel is described, for example, in Patent Literature 1. The pressure vessel described in the literature above includes a vessel body and a rib projecting outward from the vessel body. The vessel body includes a first surface (for example, a surrounding wall in the literature above) and a second surface (for example, a top wall and a bottom wall in the same literature). When internal pressure acts on the vessel body, the vessel body deforms to expand outward. The rib is intended to suppress the deformation.

CITATION LIST

Patent Literature

Patent Literature 1: JP-A-2015-200373

SUMMARY OF INVENTION

Technical Problem

In the technique described in the literature above, the maximum value of the projection amount of the rib provided on the first surface is the same as the maximum value of the projection amount of the rib provided on the second surface. This poses a problem that the rib becomes large in size. As a result, there may arise a problem of an increase in the mass of the pressure vessel, a problem of wasting of the material of the pressure vessel, a problem of a rise of the cost of the pressure vessel, a problem of an increase in the size of the pressure vessel, and a problem of requiring a wide space for disposing the pressure vessel. On the other hand, when the rib size is merely reduced, the pressure vessel may lack the strength.

An object of the present invention is to provide a pressure vessel that allows for reduction in the rib size while ensuring the strength of the pressure vessel.

Solution to Problem

The pressure vessel of the present invention includes a vessel body and a rib. The vessel body can house a fluid in its internal space. The rib projects outward of the vessel body from the vessel body. The vessel body includes a first surface and a second surface. The first surface forms the internal space by extending in a vessel body axial direction that is an axial direction of the vessel body, and extending in a first direction that is a direction perpendicular to the vessel body axial direction. The second surface is connected to the first surface and forms the internal space by extending in the vessel body axial direction and extending in a second direction that is a direction perpendicular to the vessel body axial direction and the first direction. The rib includes a first rib and a second rib. The first rib projects in the second direction from the first surface and extends in the first direction. The second rib is provided in series with the first rib, projects in the first direction from the second surface, and extends in the second direction. The width in the second direction of the internal space is smaller than the width in the first direction of the internal space. The maximum value of the projection amount of the second rib from the second surface to the outside of the vessel body in the first direction is smaller than the maximum value of the projection amount of the first rib from the first surface to the outside of the vessel body in the second direction.

Advantageous Effects of Invention

Due to the configuration above, the rib can be reduced in size while ensuring the strength of the pressure vessel.

BRIEF DESCRIPTION OF DRAWINGS

FIG. 5 is an enlarged diagram of the F5 portion illustrated in FIG. 3.

FIG. 6 is an enlarged diagram of the F6 portion illustrated in FIG. 4.

DESCRIPTION OF EMBODIMENTS

First Embodiment

Figure 1:
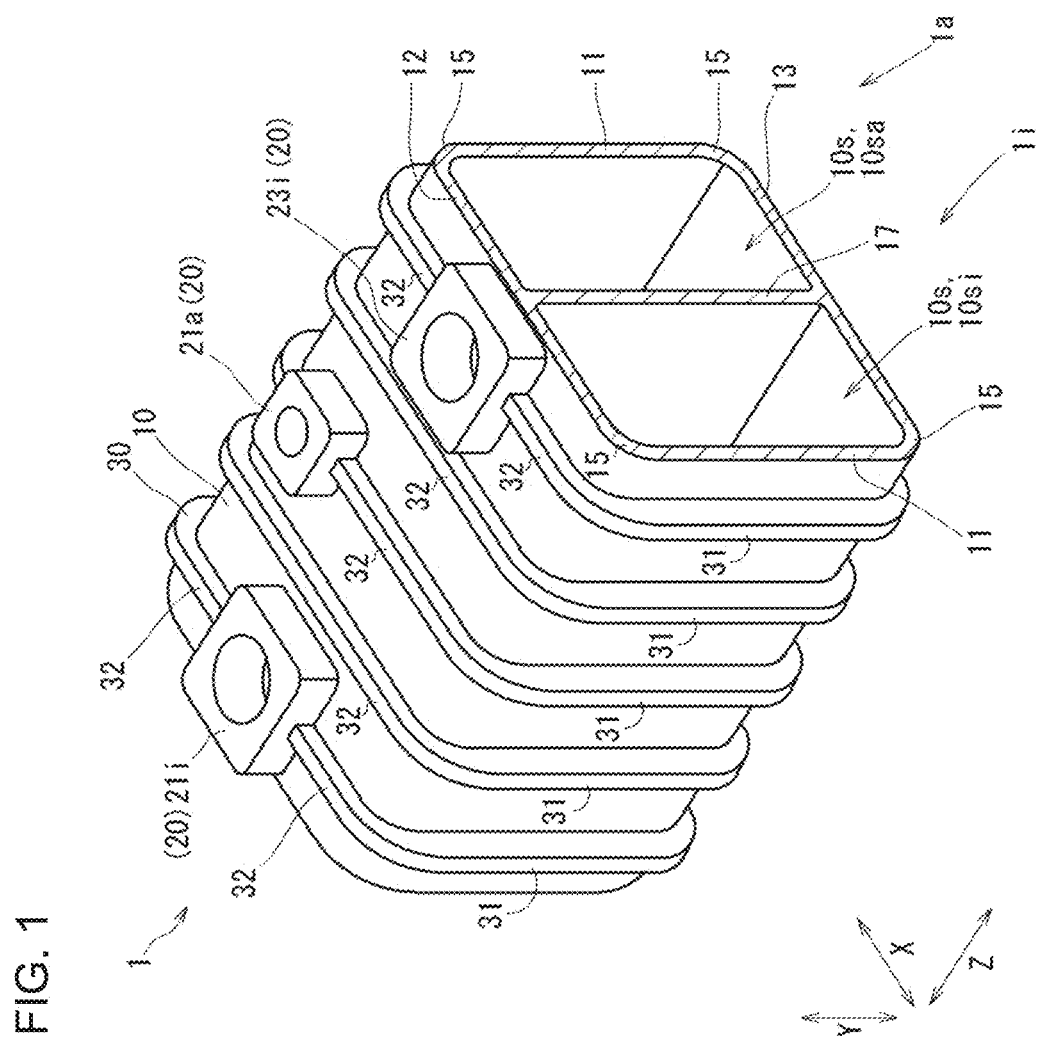
FIG. 1 is a perspective diagram of the pressure vessel, which a diagram illustrating a state where a part of the pressure vessel is cut.

The pressure vessel 1 (see FIG. 1) of the first embodiment is described by referring to FIG. 1 to FIG. 8.

The pressure vessel 1 is a vessel capable of housing a fluid. The fluid housed in the pressure vessel 1 may be any of gas, air and liquid. The pressure vessel 1 is configured to make the internal pressure of the pressure vessel 1 higher than the external pressure. The pressure vessel 1 is a cast produced by casting. The pressure vessel 1 is a vessel for cooling a fluid and is, for example, a gas cooler. The pressure vessel 1 includes an aftercooler 1*a* (first vessel) and an intercooler 1*i* (second vessel).

For example, the pressure vessel 1 constitutes a compressor unit (not shown). The compressor unit includes a compressor and the pressure vessel 1. The compressor is an oil-free compressor. The compressor compresses air in two stages and includes a first-stage compressor and a second-stage compressor. Air compressed to high temperature (adiabatically compressed) through the first-stage compressor is cooled in the intercooler 1*i* and caused to return to room temperature. The air returned to room temperature is again compressed by the second-stage compressor. The air compressed to high temperature through the second-stage compressor is again cooled in the aftercooler 1a and caused to return to room temperature and is then supplied to a user (the users of compressed air).

In the pressure vessel 1, the aftercooler 1a and the intercooler 1i are integrally constructed (integral type). Accordingly, compared with a case where the aftercooler 1a and the intercooler 1i are not integrated (for example, a case where these are provided at positions distant from each other), the space necessary for providing the intercooler 1i and the aftercooler 1a can be reduced. Consequently, the compressor unit can be reduced in size. The aftercooler 1a and the intercooler 1i are configured in a similar manner to each other. In the following, the aftercooler 1a is mainly described, and description of common features between the aftercooler 1a and the intercooler 1i is omitted. The pressure vessel 1 includes a vessel body 10, a fluid inlet/outlet 20, and a rib 30.

The vessel body 10 is a portion capable of housing a fluid. The fluid is housed in an internal space 10s of the vessel body 10. The shape of the vessel body 10 is non-cylindrical, is a nearly rectangular parallelepiped with the inside being hollow, and is a shape having an axial direction. The axial direction of the vessel body 10 is denoted as the vessel body axial direction Z. A direction (one direction) perpendicular to the vessel body axial direction Z is denoted as the up-and-down direction Y (first direction), and a direction perpendicular to the vessel body axial direction Z and the up-and-down direction Y is denoted as the lateral direction X (second direction). Here, "up", "down" and "lateral" are terms used merely for the convenience sake of description. For example, the up-and-down direction Y needs not be a vertical direction, and the lateral direction X needs not be a horizontal direction. When the vessel is viewed from the vessel body axial direction Z, the cross-sectional shape of the vessel body 10 is constant or substantially constant irrespective of the position in the vessel body axial direction Z. The cross-sectional shape of the vessel body 10 is nearly rectangular as viewed from the vessel body axial direction Z. The vessel body 10 may have a lid (not shown). The lid is provided at an end in the vessel body axial direction Z of the vessel body 10. The vessel body 10 includes a side surface 11 (first surface), a top surface 12 (second surface), a bottom surface 13 (second surface), an R part 15, and a partition 17.

The internal space 10s is a space inside the vessel body 10. The cross-sectional shape of the internal space 10s is nearly rectangular as viewed from the vessel body axial direction Z. As the internal space 10s, two spaces are provided in one vessel body 10. The internal space 10s includes an intercooler-side internal space 10si and an aftercooler-side internal space 10sa. In each internal space 10s, a heat exchanger (not shown) may or may not be housed.

The side surface 11 (first surface) is a surface forming the internal space 10s. The top surface 12, the bottom surface 13, the R part 15, and the partition 17 are the same in terms of being a surface forming the internal space 10s. The side surface 11 extends in the vessel body axial direction Z and extends in the up-and-down direction Y. The side surface 11 is planar or nearly planar. The top surface 12, the bottom surface 13, and the partition 17 are the same in terms of being planar or nearly planar. The side surface 11 is provided at two places. The side surfaces 11 at two places are arranged in parallel to each other and facing one another in the lateral direction X.

The top surface 12 (second surface) is connected to the side surface 11, connected to one end (upper end) in the up-and-down direction Y of each of side surfaces 11 at two places, and connected to the side surface 11 through the R part 15. The top surface 12 extends in the vessel body axial direction Z and extends in the lateral direction X. The thickness (width in the up-and-down direction Y) of the top surface 12 is the same as the thickness (width in the lateral direction X) of the side surface 11.

The bottom surface 13 (second surface) is provided symmetrically with the top surface 12 in the up-and-down direction Y. The bottom surface 13 and the top surface 12 are arranged in parallel to one another and facing each other in the up-and-down direction Y.

Figure 2:
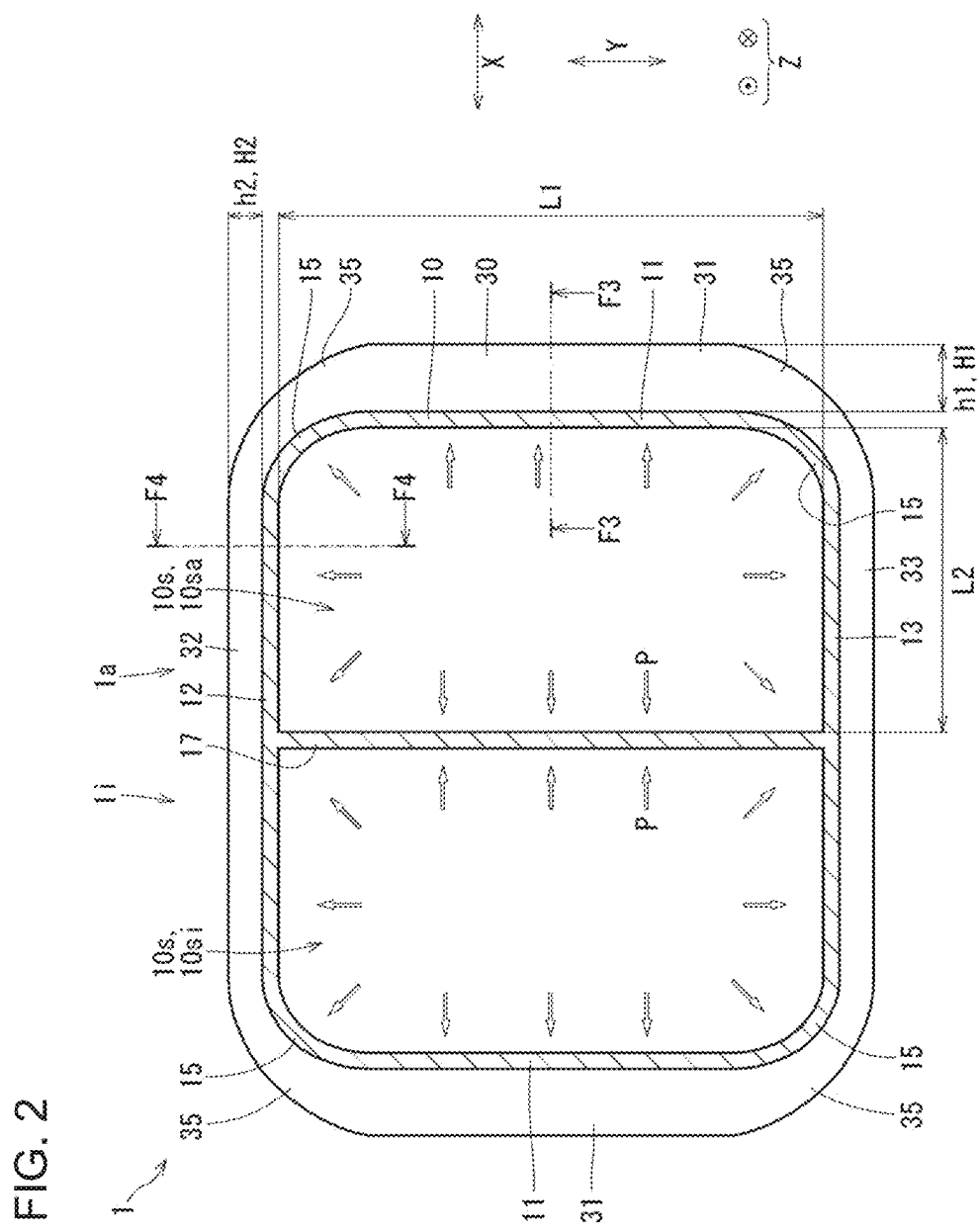
FIG. 2 is a cross-sectional diagram viewing the pressure vessel illustrated in FIG. 1 from the vessel body axial direction Z.

The R part 15 is a curved portion arranged in a corner of the vessel body 10. As illustrated in FIG. 2, when viewed from the vessel body axial direction Z, the R part 15 is provided at four corners of the nearly rectangular vessel body 10. The R part 15 is arced or substantially arced in shape as viewed from the vessel body axial direction Z.

The partition 17 separates (partitions) the intercooler-side internal space 10si and the aftercooler-side internal space 10sa. The partition 17 connects two second surfaces (top surface 12 and bottom surface 13) to each other and is arranged in parallel to the side surface 11. The partition 17 is a central partition connected to the lateral direction X central part of each of the top surface 12 and the bottom surface 13.

The partition 17 is a wall forming the intercooler-side internal space 10si and is a wall forming the aftercooler-side internal space 10sa. Accordingly, compared with a case where these walls are separately provided, the pressure vessel 1 can be reduced in weight, and the cost of the pressure vessel 1 can be suppressed.

The partition 17 acts as follows. When an internal pressure acts on the intercooler-side internal space 10si and the aftercooler-side internal space 10sa and the vessel body 10 starts deforming to expand outward, a tensile force acts on the partition 17 (tensile force in the up-and-down direction Y). Therefore, the amount of displacement in a portion (lateral direction X central) where the top surface 12 and the bottom surface 13 are connected through the partition 17 is suppressed, and the stress on the top surface 12 and the bottom surface 13 can be reduced. Consequently, the top surface 12 and the bottom surface 13 can be reduced in wall thickness. As a result, the wall thickness of the vessel body 10 can be reduced. In addition, since the stress on the top surface 12 and the bottom surface 13 can be suppressed, the rib 30 can be made small. More specifically, the wall thickness of the rib 30 can be reduced and furthermore, the projection amount of the rib 30 from the vessel body 10 can be decreased. Accordingly, the pressure vessel 1 can be reduced in weight, and the cost of the pressure vessel 1 can be suppressed.

The fluid inlet/outlet 20 is, as illustrated in FIG. 1, a hole communicating between the outside and the inside (internal space 10s) of the vessel body 10. The fluid inlet/outlet 20 includes an intercooler inlet 21i, an intercooler outlet 23i, an aftercooler inlet 21a, and an aftercooler outlet (not shown). The intercooler inlet 21i is an inlet for a fluid from the outside of the vessel body 10 to the intercooler-side internal space 10si. The intercooler outlet 23i is an outlet for a fluid from the intercooler-side internal space 10si to the outside of the vessel body 10. The aftercooler inlet 21a is an inlet for a fluid from the outside of the vessel body 10 to the aftercooler-side internal space 10sa. The aftercooler outlet is an outlet for a fluid from the aftercooler-side internal space 10sa to the outside of the vessel body 10. The intercooler inlet 21i, the intercooler outlet 23i, and the aftercooler inlet 21a are provided, for example, on the top surface 12. The aftercooler outlet is provided, for example, on the side surface 11. The fluid inlet/outlet 20 is not included in the rib 30. The projection amount of the fluid inlet/outlet 20 from the vessel body 10 may be larger or smaller than the projection amount of the rib 30 from the vessel body 10.

The rib 30 (reinforcing rib) reinforces the vessel body 10. The rib 30 reduces deformation of or stress generated in the vessel body 10 when an internal pressure acts on the inner surface of the vessel body 10. The rib 30 projects from the vessel body 10 to the outside of the vessel body 10. The "outside of the vessel body 10" is an opposite side of the internal space 10s relative to the vessel body 10. A plurality of ribs 30 are provided at equal intervals in the vessel body axial direction Z. The rib 30 is provided over the whole or substantially the whole circumference of the vessel body 10 so as to surround the vessel body 10. The rib 30 extends in, so to speak, a circumferential direction of the vessel body 10. The rib 30 has a plate-like or nearly plate-like shape. The rib 30 is constructed integrally with the vessel body 10. As illustrated in FIG. 2, the rib 30 includes a side surface rib 31 (first rib), a top surface rib 32 (second rib), a bottom surface rib 33 (second rib), and an R part rib 35.

The side surface rib 31 (first rib) projects in the lateral direction X from the side surface 11 and extends in the up-and-down direction Y. The side surface rib 31 is arranged linearly as viewed from the lateral direction X.

The top surface rib 32 (second rib) projects in the up-and-down direction Y from the top surface 12 and extends in the lateral direction X. The top surface rib 32 is arranged linearly as viewed from the up-and-down direction Y. The top surface rib 32 is provided in series with the side surface rib 31. The top surface rib 32 is provided in continuity with the side surface rib 31 via the R part rib 35. The thickness (width in the vessel body axial direction Z) of the top surface rib 32 is the same as the thickness of the side surface rib 31 (the same applies to the thickness of each of the bottom surface rib 33 and the R part rib 35).

The bottom surface rib 33 (second rib) is provided symmetrically with the top surface rib 32 in the up-and-down direction Y. In the following, description of the bottom surface rib 33 is omitted.

The R part rib 35 projects from the R part 15 to the outside of the vessel body 10. The R part ribs 35 project from four R parts 15, respectively, to the outside of the vessel body 10. The R part rib 35 is connected to the second rib (top surface rib 32 or bottom surface rib 33) and the side surface rib 31.

(Width L1, Width L2, Maximum Bending Moment)

The width in the up-and-down direction Y of the internal space 10s is denoted as width L1. The width L1 is a distance (shortest distance) in the up-and-down direction Y from the top surface 12 to the bottom surface 13. The width in the lateral direction X of the internal space 10s is denoted as width L2. The width L2 is a distance in the lateral direction X from the partition 17 to the side surface 11. The width L2 is smaller than the width L1. The width L2 in the lateral direction X of the aftercooler-side internal space 10sa is smaller than the width L1 in the top-and-down direction Y of the aftercooler-side internal space 10sa (the same applies to the intercooler-side internal space 10si). The maximum bending moment M1 of the side surface 11 is generated in a portion on the side surface 11, which is adjacent to the up-and-down direction Y central part of the internal space 10s, and generated in the up-and-down direction Y central part of the side surface 11. The maximum bending moment M2 of the top surface 12 is generated in a portion on the top surface 12, which is adjacent to the lateral direction X central part of the internal space 10s. Since the width L2 is smaller than the width L1, the maximum bending moment M2 of the upper surface 12 is smaller than the maximum bending moment M1 of the side surface 11.

(Projection Amount of Rib 30)

The projection amount (height) of the side surface rib 31 from the side surface 11 to the outside of the vessel body 10 and also in the lateral direction X is denoted as a first projection amount h1. The maximum value of the first projection amount h1 is denoted as a maximum first projection amount H1. The projection amount of the top surface rib 32 from the top surface 12 to the outside of the vessel body 10 and also in the up-and-down direction Y is denoted as a second projection amount h2. The maximum value of the second projection amount h2 is denoted as a maximum second projection amount H2. The maximum second projection amount H2 is smaller than the maximum first projection amount H1. Accordingly, the maximum value of the projection amount of the rib 30 fixed to a surface having a smaller maximum bending moment (top surface 12) becomes smaller than the maximum value of the projection amount of the rib 30 fixed to a surface having a larger maximum bending moment (side surface 11). In this embodiment, the first projection amount h1 is constant irrespective of the position in the up-and-down direction Y and is the maximum first projection amount H1. In this embodiment, the projection amount of the top surface rib 32 from the top surface 12 in the up-and-down direction Y is constant irrespective of the position in the lateral direction X and is the maximum second projection amount H2.

The maximum first projection amount H1 and the maximum second projection amount H2 are set according to the ratio (L1/L2) between the width L1 and the width L2. The maximum first projection amount H1 and the maximum second projection amount H2 are set such that the ratio (H1/H2) between the maximum first projection amount H1 and the maximum second projection amount H2 falls in a range of 0.7 times or more and 1.3 times or less the square of the ratio (L1/L2). More specifically, the maximum first projection amount H1 and the maximum second projection amount H2 are set to satisfy the following equation A1:

$$0.7 \cdot (L1/L2)^2 \leq H1/H2 \leq 1.3 \cdot (L1/L2)^2 \quad \text{(equation A1)}$$

Here, the maximum bending moment M1 of the side surface 11 is proportional to $L1^2$, and the maximum bending moment M2 of the top surface 12 is proportional to $L2^2$. Therefore, in the case of satisfying equation A1, the maximum first projection amount H1 and the maximum second projection amount H2 are set according to the ratio (M1/M2) between the maximum bending moment M1 and the maximum bending moment M2.

(Plastic Section Modulus)

Figure 3:
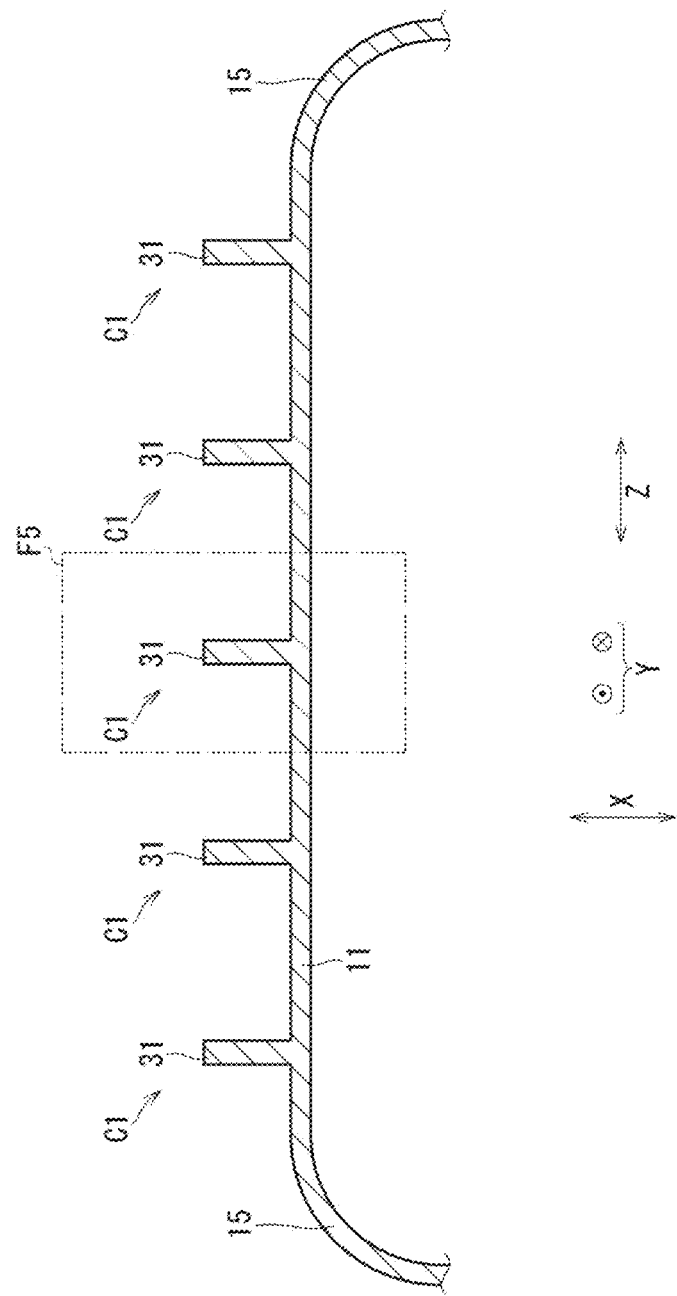
FIG. 3 is a cross-sectional diagram as viewed from an arrow F3-F3 of FIG. 2.

As illustrated in FIG. 3, when viewed from the up-and-down direction Y, the side surface 11 and a plurality of side surface ribs 31 have a structure in which a repeating unit cross-section C1 is repeated in the vessel body axial direction Z. The repeating unit cross-section C1 is a cross-section of a repeating unit including the side surface 11 and the side surface rib 31 and is a cross-section as viewed from the up-and-down direction Y. The repeating unit cross-section C1 is a cross-section including a portion in which the first projection amount h1 of the side surface rib 31 becomes the maximum first projection amount H1. The plastic section modulus Zp1 of the repeating unit cross-section C1 is determined based on the maximum first projection amount H1 (see FIG. 2) (see later for details).

Figure 4:
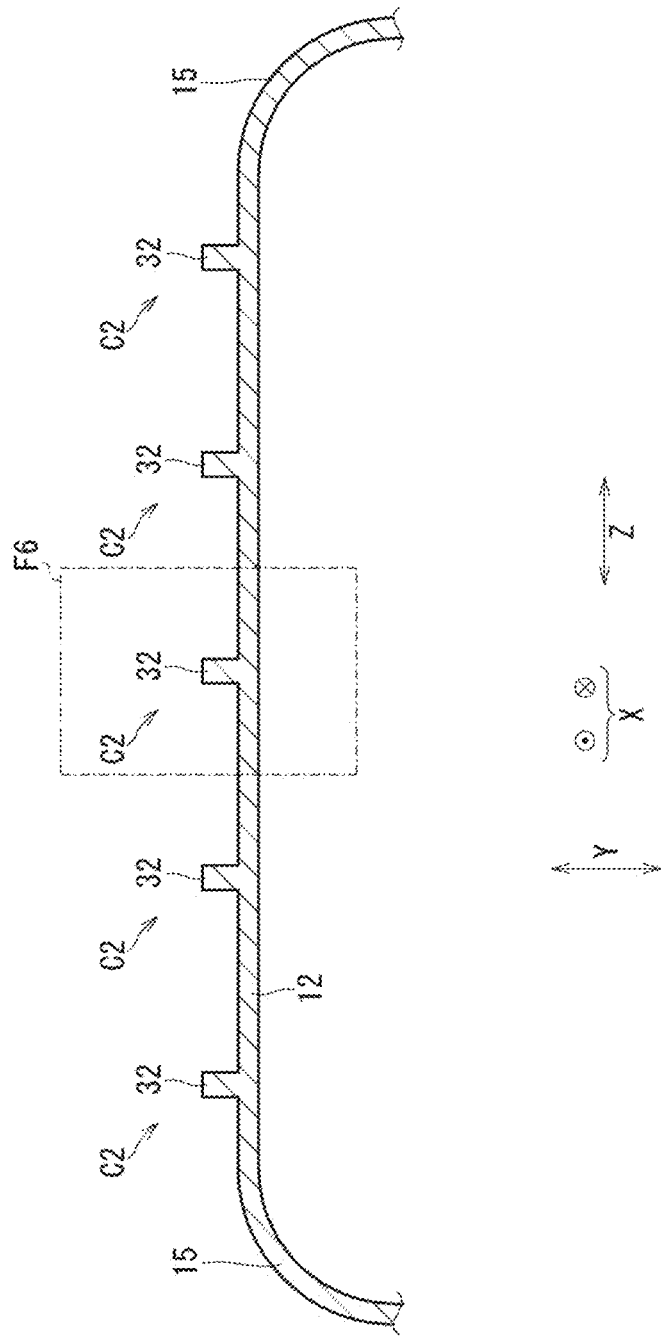
FIG. 4 is a cross-sectional diagram as viewed from an arrow F4-F4 of FIG. 2.

As illustrated in FIG. 4, when viewed from the lateral direction X, the top surface 12 and a plurality of top surface ribs 32 have a structure in which a repeating unit cross-section C2 is repeated in the vessel body axial direction Z. The repeating unit cross-section C2 is a cross-section of a repeating unit including the top surface 12 and the top surface rib 32 and is a cross-section as viewed from the lateral direction X. The repeating unit cross-section C2 is a cross-section including a portion in which the second projection amount h2 of the top surface rib 32 becomes the maximum second projection amount H2. The plastic section modulus Zp2 of the repeating unit cross-section C2 is determined based on the maximum second projection amount H2 (see FIG. 2) (see later for details).

The maximum first projection amount H1 and the maximum second projection amount H2, illustrated in FIG. 2, are set according to the ratio (Zp1/Zp2) between the plastic section modulus Zp1 and the plastic section modulus Zp2. The maximum first projection amount H1 and the maximum second projection amount H2 are set such that the ratio (Zp1/Zp2) falls in a range of 0.7 times or more and 1.3 times or less the square of the ratio (L1/L2). More specifically, the maximum first projection amount H1 and the maximum second projection amount H2 are set to satisfy the following equation A2:

$$0.7 \cdot (L1/L2)^2 \leq Zp1/Zp2 \leq 1.3 \cdot (L1/L2)^2 \quad \text{(equation A2)}$$

(Details of Plastic Section Modulus)

Equation A2 is determined as follows. The area Ac1 of the repeating unit cross-section C1 illustrated in FIG. 5 is represented by the following equation:

$$Ac1 = t1 \cdot H1 + a1 \cdot b1$$

t1: thickness (width in the vessel body axial direction Z) of the side surface rib 31, a1: thickness (width in the lateral direction X) of the side surface 11, and b1: bit width in the vessel body axial direction Z of the side surface 11 in one repeating unit cross-section C1.

Here, $$Ac1' = (t1 \cdot H1 + a1 \cdot b1)/2$$

$$e1 = Ac1'/b1$$

e1 is a distance from an end face of the side surface rib 31, which is an end face on the side adjacent to the internal space 10s (see FIG. 2), to the plastic neutral axis of the repeating unit cross-section C1. The plastic section modulus Zp1 of the repeating unit cross-section C1 is represented by the following equation B1:

$$Zp1 = Ac1' \cdot [e1/2 + \{H1 + (a1-e1)\}/2] \quad \text{(equation B1)}$$

The full plastic moment (maximum bending moment Mp1 in a fully plastic state) of the repeating unit cross-section C1 is represented by the following equation B2:

$$Mp1 = Zp1 \cdot \sigma y1 \quad \text{(equation B2)}$$

In the equation, $\sigma y1$ is a yield stress of the material for the side surface 11 and the side surface rib 31.

An area Ac2 of the repeating unit cross-section C2 illustrated in FIG. 6 is represented by the following equation:

$$Ac2 = t2 \cdot H2 + a2 \cdot b2$$

t2: thickness (width in the vessel body axial direction Z) of the top surface rib 32, a2: thickness (width in the up-and-down direction Y) of the top surface 12, and b2: width in the vessel body axial direction Z of the top surface 12 in one repeating unit cross-section C2.

Here, $$Ac2' = (t2 \cdot H2 + a2 \cdot b2)/2 \quad \text{(equation B3a)}$$

$$e2 = Ac2'/b2 \quad \text{(equation B3b)}$$

e2 is a distance from an end face of the top surface 12, which is an end face on the side adjacent to the internal space 10s (see FIG. 2), to the plastic neutral axis of the repeating unit cross-section C2. The plastic section modulus Zp2 of the repeating unit cross-section C2 is represented by the following equation B3c:

$$Zp2 = Ac2' \cdot [e2/2 + \{H2 + (a2-e2)\}/2] \quad \text{(equation B3c)}$$

The full plastic moment (maximum bending moment Mp2 in a fully plastic state) of the repeating unit cross-section C2 is represented by the following equation B4:

$$Mp2 = Zp2 \cdot \sigma y2 \quad \text{(equation B4)}$$

In the equation, $\sigma y2$ is a yield stress of the material for the top surface 12 and the top surface rib 32. In this embodiment, the material for the top surface 12 and the top surface rib 32 is the same as the material for the side surface 11 and the side surface rib 31.

The maximum bending moment Mp1 acting on the side surface 11 when an internal pressure P (uniformly distributed load) acts on the vessel body 10 illustrated in FIG. 2 is represented by the following equation B5:

$$Mp1 = P \cdot L1^2/8 \quad \text{(equation B5)}$$

Similarly, the maximum bending moment Mp2 acting on the top surface 12 when an internal pressure P acts on the vessel body 10 is represented by the following equation B6:

$$Mp2 = P \cdot L2^2/8 \quad \text{(equation B6)}$$

The following equation B7 is obtained from equations B2, B4, B5 and B6, and equation B8 is obtained from equation B7:

$$Mp1/Mp2 = (L1/L2)^2 = (Zp1 \cdot \sigma y1)/(Zp2 \cdot \sigma y2) \quad \text{(equation B7)}$$

$$Zp1/Zp2 = (\sigma y2/\sigma y1) \cdot (L1/L2)^2 \quad \text{(equation B8)}$$

The materials constituting respective parts of the pressure vessel 1 vary in yield stress. For example, the variation in strength of the cast (cast iron) is about average value±30% (approximately from 0.7 σy to 1.3 σy) at most. Then, (σy2/σy1) of equation B8 should be 0.7 or more and 1.3 or less. Zp1/Zp2 is preferably set to satisfy the following equation B9. Equation B9 is the same equation as equation A2.

$$0.7 \cdot (L1/L2)^2 \leq Zp1/Zp2 \leq 1.3 \cdot (L1/L2)^3 \quad \text{(equation B9)}$$

The region requiring the highest strength of the vessel body 10 is the up-and-down direction Y central part of the side surface 11. Based on the strength required for this region, the maximum first projection amount H1 of the side surface rib 31 is determined. Then, an equation for determining the maximum second projection amount H2 (unknown value) of the top surface rib 32 from the maximum first projection amount H1 (known value) is described.

The following equation B10 is obtained from equation B8:

$$Zp2 = (\sigma y1/\sigma y2) \cdot Zp1 \cdot (L2/L1)^2 = (\sigma y1/\sigma y2) \cdot J \quad \text{(equation B10)}$$

In the equation, $$J = Zp1 \cdot (L2/L1)^2.$$

The following equation B11 is obtained from equations B3a, B3b and B3c:

$$Zp2=(t2 \cdot H2+a2 \cdot b2) \cdot (H2+a2)/4=\{t2 \cdot H2^2+a2 \cdot (b2+t2) \cdot H2+a2^2 \cdot b2\}/4 \quad \text{(equation B11)}$$

The following equation B12 is obtained from equations B10 and B11:

$$\{t2 \cdot H2^2+a2 \cdot (b2+t2) \cdot H2+a2^2 \cdot b2\}/4=(\sigma y1/\sigma y2) \cdot J \quad \text{(equation B12)}$$

When equation B12 is modified and organized into quadratic equation of H2, the following equation B13 is obtained.

$$t2 \cdot H2^2+a2 \cdot (b2+t2) \cdot H2+a2^2 \cdot b2-4 \cdot J \cdot (\sigma y1/\sigma y2)=0 \quad \text{(equation B13)}$$

Equation B13 can be organized as follows.

$$A \cdot H2^2+B \cdot H2+C=0 \quad \text{(equation B14)}$$

In the equation, $$A=t2$$

$$B=a2 \cdot (b2+t2)$$

$$C=a2^2 \cdot b2-4 \cdot J \cdot (\sigma y1/\sigma y2)$$

From equation B14, the maximum second projection amount H2 can be represented by the following equation B15:

$$H2=[-B+(B^2-4 \cdot A \cdot C)^{1/2}]/(2 \cdot A) \quad \text{(equation B15)}$$

According to equation B15, the maximum second projection amount H2 can be calculated based on the dimension regarding the repeating unit cross-section C1 (see FIG. 3), the dimension regarding the repeating unit cross-section C2 (see FIG. 3), the width L1 and width L2 of the internal space 10s illustrated in FIG. 2, and ($\sigma y1/\sigma y2$). As with equation B9, it is preferable also in equation B15 to consider that ($\sigma y1/\sigma y2$) is 0.7 or more and 1.3 or less.

(Comparison)

Figure 7:
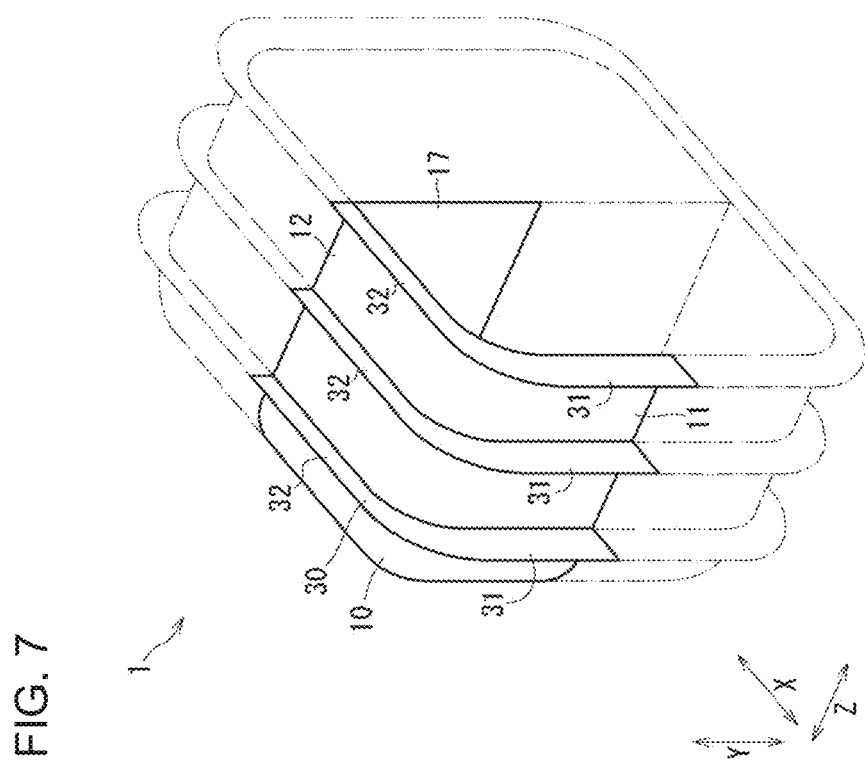
FIG. 7 is a perspective diagram illustrating a shell model for analysis of the pressure vessel illustrated in FIG. 1.

The pressure vessel 1 of the present embodiment and the pressure vessel 501 (see FIG. 12) of Comparative Example were compared. With respect to each of the pressure vessel 1 and the pressure vessel 501, the elasto-plastic analysis at the time of causing an internal pressure to act on a shell model (thin plate model) for analysis was performed. As the analysis, FEM (Finite Element Method) analysis was used. FIG. 7 illustrates a shell model of the pressure vessel 1 of this embodiment. This model is a model formed by dividing the pressure vessel 1 into ⅛'s by the utilization of symmetry of the pressure vessel 1 in each of the up-and-down direction Y, the lateral direction X, and the vessel body axial direction Z (⅛ model). In this model, equations A1 and A2 are satisfied. Note here that in FIG. 7, the pressure vessel 1 divided into ½'s is indicated by a two-dot chain line and a solid line.

Figure 12:
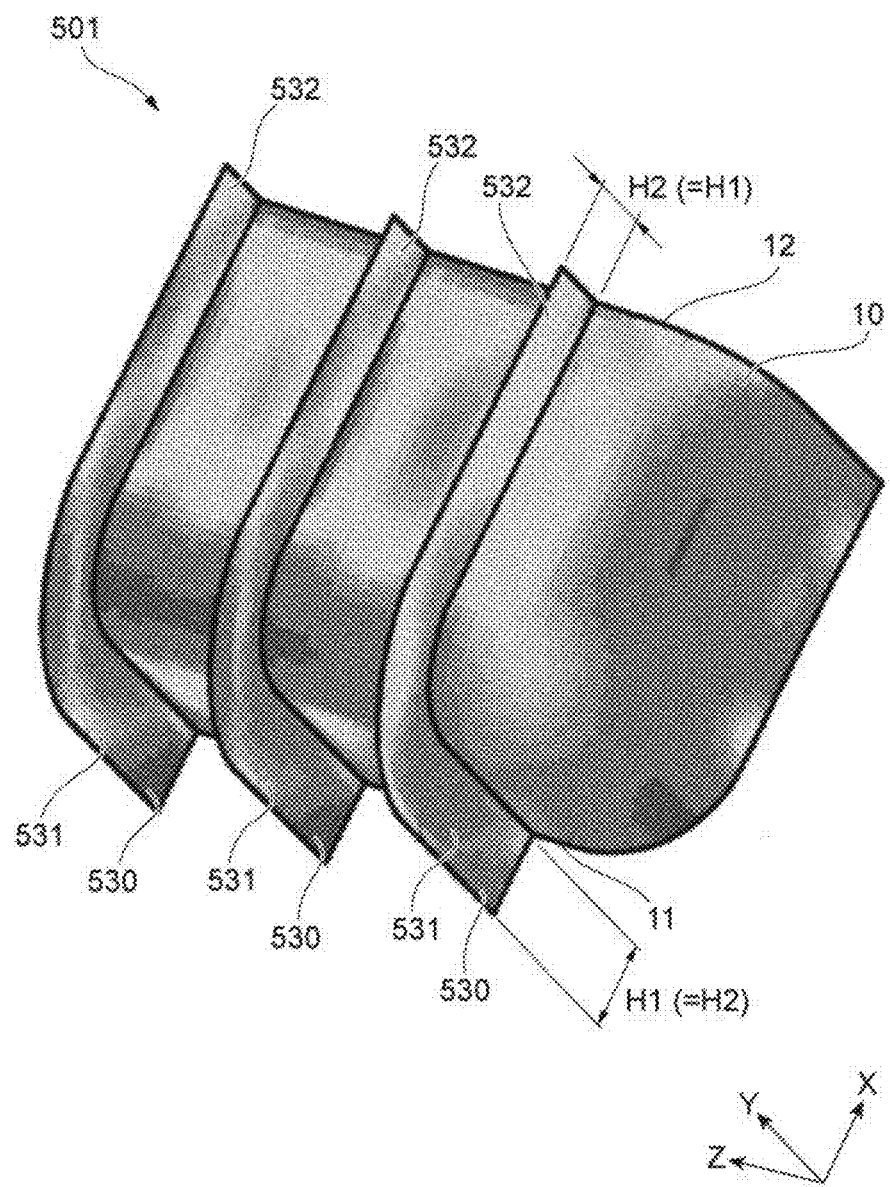
FIG. 12 is a diagram corresponding to FIG. 8 of Comparative Example.

In the pressure vessel 501 of Comparative Example illustrated in FIG. 12, the projection amount of the rib 530 from the vessel body 10 is constant. In the pressure vessel of Comparative Example, the maximum first projection amount H1 of the side surface rib 531 is equal to the maximum second projection amount H2 of the top surface rib 532. The configuration (dimension, shape) of the pressure vessel 501 of Comparative Example, except for the projection amount of the rib 530 from the vessel body 10, is the same as that of the pressure vessel 1 of this embodiment.

Figure 8:
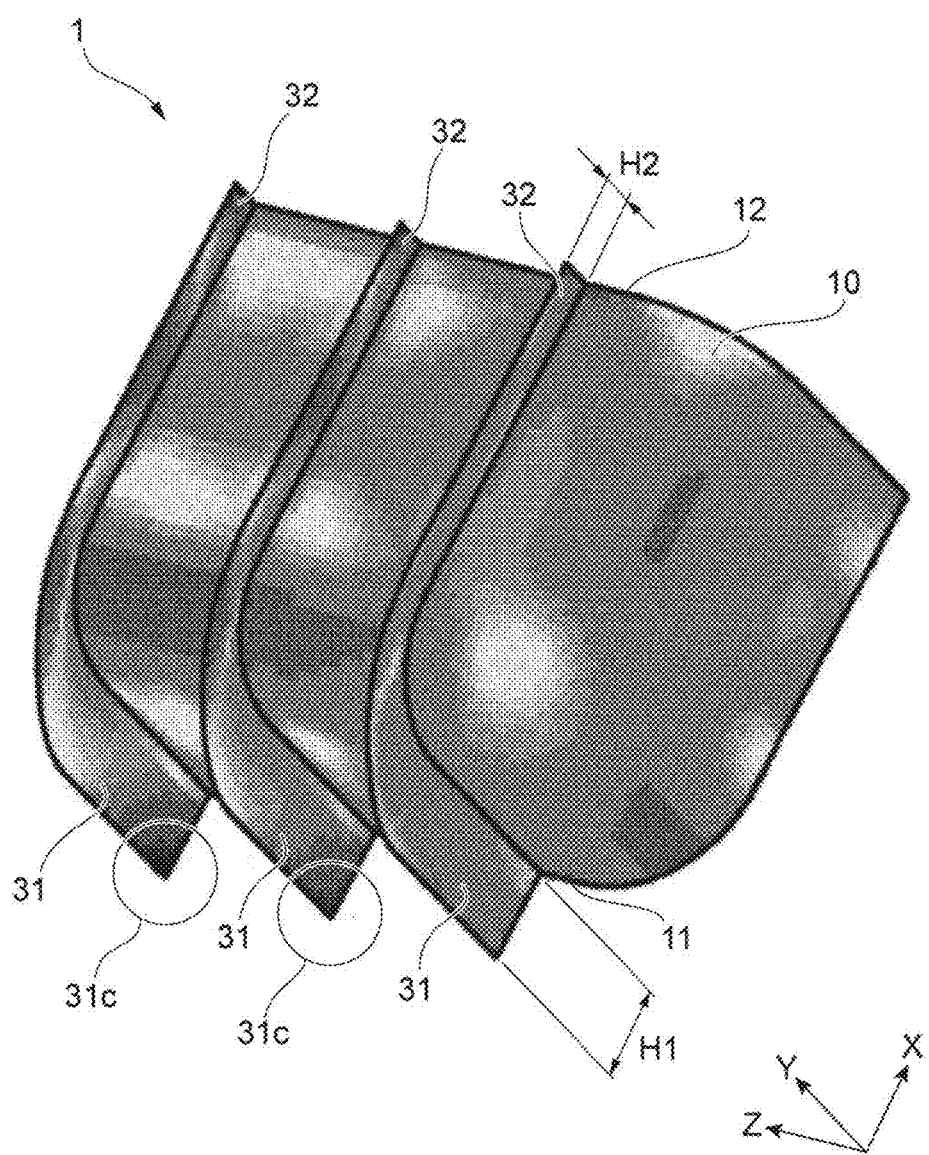
FIG. 8 is a perspective diagram illustrating von Mises stress distribution of the pressure vessel illustrated in FIG. 7.

FIG. 8 illustrates von Mises stress distribution of the pressure vessel 1 of this embodiment. FIG. 12 illustrates von Mises stress distribution of the pressure vessel 501 of Comparative Example. In FIG. 8 and FIG. 12, a region having higher von Mises stress is depicted with darker color. When the stress in a portion having high stress (high stress area) of the pressure vessel 1 is compared with the stress in a high stress area of the pressure vessel 501, these are substantially the same (excluding the portion 31c illustrated in FIG. 8). Accordingly, it can be said that the pressure capacity of the pressure vessel 1 is at the same level as the pressure capacity of the pressure vessel 501.

The stress generated in the top surface 12 and top surface rib 532 of the pressure vessel 501 illustrated in FIG. 12 is low over a wide range (the color is light), compared with the stress generated in the top surface 12 and top surface rib 32 of the pressure vessel 1 illustrated in FIG. 8. It is therefore understood that in the pressure vessel 501 of Comparative Example illustrated in FIG. 12, the area having the material strength to spare is wide and the area wasting the material is wide. On the other hand, in the pressure vessel 1 of this embodiment illustrated in FIG. 8, over substantially the whole area of the top surface 12 and top surface rib 32, the stress generated in the top surface 12 and top surface rib 32 can be made as high as the stress generated in the side surface 11 and side surface rib 31.

The maximum second projection amount H2 of the top surface rib 32 of this embodiment illustrated in FIG. 8 is small, compared with the maximum second projection amount H2 of the top surface rib 532 of Comparative Example illustrated in FIG. 12. Therefore, the pressure vessel 1 of this embodiment can be made smaller and lighter in weight than that of Comparative Example while ensuring the pressure capacity at the same level as in Comparative Example.

(Effects of First Invention)

The effects due to the pressure vessel 1 illustrated in FIG. 1 are as follows. The pressure vessel 1 includes a vessel body 10 capable of housing a fluid in its internal space 10s and a rib 30 projecting from the vessel body 10 to the outside of the vessel body 10. The vessel body 10 includes a side surface 11 and a top surface 12. The side surface 11 forms the internal space 10s by extending in a vessel body axial direction Z that is an axial direction of the vessel body 10, and extending in an up-and-down direction Y that is a direction perpendicular to the vessel body axial direction Z. The top surface 12 is connected to the side surface 11 and forms the internal space 10s by extending in the vessel body axial direction Z and extending in a lateral direction X that is a direction perpendicular to the vessel body axial direction Z and the up-and-down direction Y. The rib 30 includes a side surface rib 31 and a top surface rib 32. The side surface rib 31 projects in the lateral direction X from the side surface 11 and extends in the up-and-down direction Y. The top surface rib 32 is provided in series with the side surface rib 31, projects in the up-and-down direction Y from the top surface 12, and extends in the lateral direction X.

[Configuration 1-1]

As illustrated in FIG. 2, the width L2 in the lateral direction X of the internal space 10s is smaller than the width L1 in the up-and-down direction Y of the internal space 10s.

[Configuration 1-2]

The maximum value of the projection amount of the top surface rib 32 from the top surface 12 to the outside of the vessel body 10 and also in the up-and-down direction Y (maximum second projection amount H2) is smaller than the maximum value of the projection amount of the side surface rib 31 from the side surface 11 to the outside of the vessel body 10 and also in the lateral direction X (maximum first projection amount H1).

Thanks to [configuration 1-1], the maximum bending moment M2 in a portion on the top surface 12, which is adjacent to the lateral direction X central part of the internal space 10s, is smaller than the maximum bending moment M1 in a portion on the side surface 11, which is adjacent to the up-and-down direction Y central part of the internal space 10s. In turn, the strength required for the top surface 12 is small, compared with the strength required for the side surface 11. Then, the pressure vessel 1 takes [configuration 1-2]. The rib 30 (top surface rib 32) can therefore be made small while ensuring the strength of the pressure vessel 1. As a result, the pressure vessel 1 can be reduced in weight, the material of the pressure vessel 1 can be prevented from wasting, the cost of the pressure vessel 1 can be suppressed, the pressure vessel 1 can be made small, and the space necessary for providing the pressure vessel 1 can be reduced.

(Effects of Second Invention)
[Configuration 2]

The width in the up-and-down direction Y of the internal space 10s is denoted by L1. The width in the lateral direction X of the internal space 10s is denoted by L2. The maximum value of the projection amount of the side surface rib 31 from the side surface 11 to the outside of the vessel body 10 and in the lateral direction X is denoted by H1. The maximum value of the projection amount of the top surface rib 32 from the top surface 12 to the outside of the vessel body 10 and in the up-and-down direction Y is denoted by H2. At this time, these satisfy $0.7 \cdot (L1/L2)^2 \leq H1/H2 \leq 1.3 \cdot (L1/L2)^2$.

Thanks to [configuration 2], the top surface rib 32 can be reduced in size while more unfailingly ensuring the strength of the pressure vessel 1, compared with a case of not satisfying the condition above.

(Effects of Third Invention)
[Configuration 3]

As illustrated in FIG. 1, a plurality of ribs 30 are provided at equal intervals in the vessel body axial direction Z. As illustrated in FIG. 3, the plastic section modulus of a cross-section of a repeating unit including the side surface 11 and the side surface rib 31, which is a cross-section viewed from the up-and-down direction Y (repeating unit cross-section C1), is denoted by Zp1. As illustrated in FIG. 4, the plastic section modulus of a cross-section of a repeating unit including the top surface 12 and the top surface rib 32, which is a cross-section viewed from the lateral direction X (repeating unit cross-section C2), is denoted by Zp2. At this time, these satisfy $0.7 \cdot (L1/L2)^2 \leq Zp1/Zp2 \leq 1.3 \cdot (L1/L2)^2$.

Thanks to [configuration 3], the top surface rib 32 can be reduced in size while more unfailingly ensuring the strength of the pressure vessel 1, compared with a case of not satisfying the condition above. The pressure vessel according to the embodiment of the present invention is often subjected to a pressure test and required to pass the test. In the pressure test, for confirming the pressure capacity of the pressure vessel, how the transition of deformation of the vessel from an elastic region to a plastic region occurs due to the pressure applied to the pressure vessel is examined. Therefore, evaluation not by the elastic section modulus but by the plastic section modulus is needed.

Second Embodiment

Figure 9:
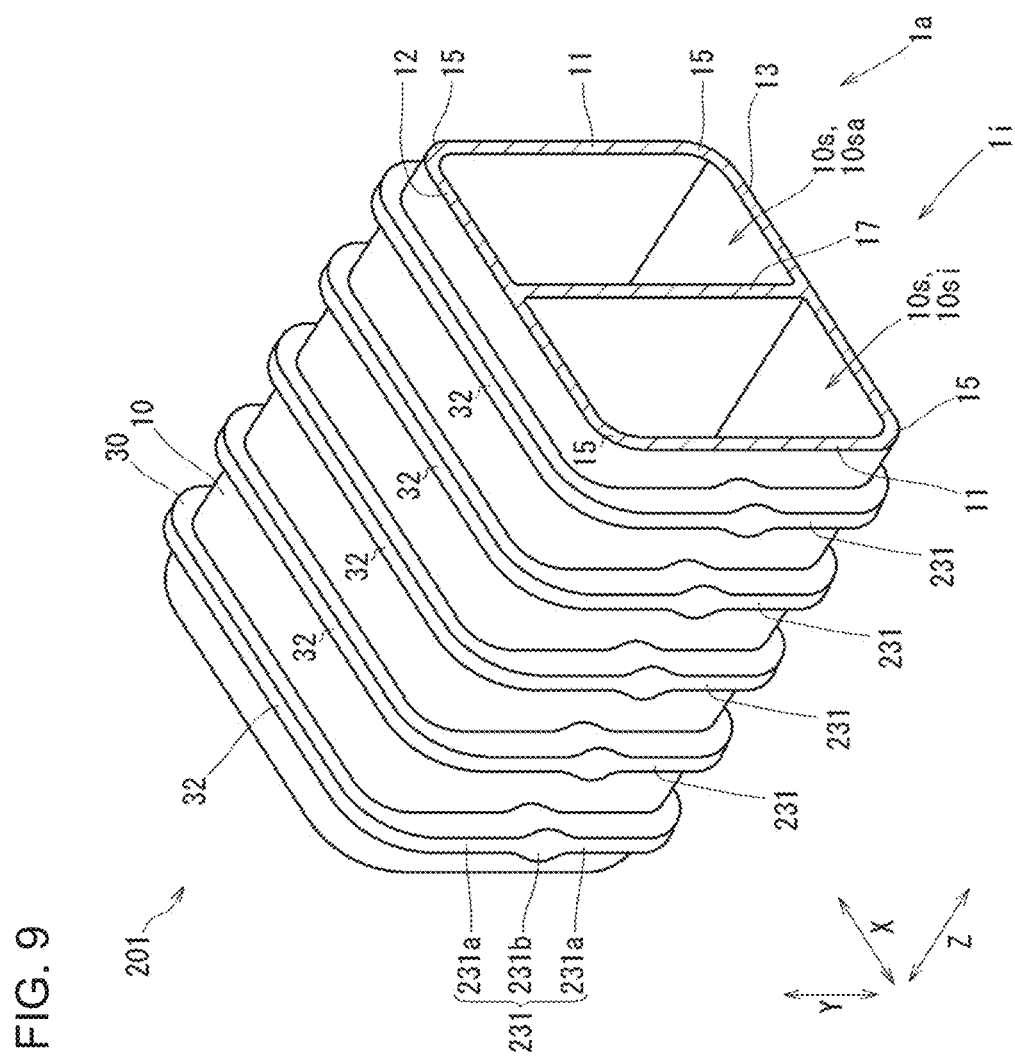
FIG. 9 is a diagram corresponding to FIG. 1 of the second embodiment.

With respect to the pressure vessel 201 of the second embodiment, the difference from the first embodiment is described by referring to FIG. 9. Note that in the pressure vessel 201 of the second embodiment, as for features in common with the first embodiment, the same sign as in the first embodiment is used or the sign is omitted, and description is omitted (in terms of omitting the sign or description of common features, the same applies to descriptions of other embodiments). As illustrated in FIG. 1, in the first embodiment, the wall thickness of the side surface rib 31 is constant irrespective of the position in the up-and-down direction Y. On the other hand, as illustrated in FIG. 9, in the second embodiment, the wall thickness of the side surface rib 231 is not constant. The side surface rib 231 includes a thin-walled part 231a and a thick-walled part 231b. In FIG. 9, the fluid inlet/outlet 20 (see FIG. 1) is omitted.

The thick-walled part 231b is provided as follows. As illustrated in FIG. 8, in a small portion (portion 31c) in the up-and-down direction Y central part of the side surface rib 31 of the first embodiment, high stress compared with other portions is sometimes generated. Therefore, in order to suppress this stress, a thick-walled part 231b illustrated in FIG. 9 is provided. The thick-walled part 231b is provided in the up-and-down direction Y central part of the side surface rib 231. The thickness (width in the vessel body axial direction Z) of the thick-walled part 231b is larger than the thickness of the thin-walled part 231a. The thickness in the up-and-down direction Y central part of the side surface rib 231 is larger than that in the portion other than the up-and-down direction Y central part of the side surface rib 231. For example, the width in the up-and-down direction Y of the thick-walled part 231b is ½ times, ⅓ times, ¼ times, or ⅕ times, etc. the width L1 (see FIG. 2). The thick-walled part 231b is, for example, tapered. Specifically, the thickness of the thick-walled part 231b increases as getting closer to the center in the up-and-down direction Y of the side surface rib 231. For example, in the case where the pressure vessel 201 is manufactured by casting, the side surface rib 231 can be easily manufactured by manufacturing the casting mold such that the wall thickness of the side surface rib 231 varies depending on the position in the up-and-down direction Y.

(Effects of Fourth Invention)

The effects due to the pressure vessel 201 of this embodiment illustrated in FIG. 9 are as follows.

[Configuration 4]

The thickness in the up-and-down direction Y central part (thick-walled part 231b) of the side surface rib 231 is larger than the thickness in the portion (thin-walled part 231a) other than the up-and-down direction Y central part of the side surface rib 231.

Thanks to [configuration 4] above, stress in the up-and-down direction Y central part of the side surface rib 231 can be suppressed. In addition, the side surface rib 231 can be reduced in size compared with a case of setting the whole of the side surface rib 231 to have a constant thickness.

Third Embodiment

Figure 10:
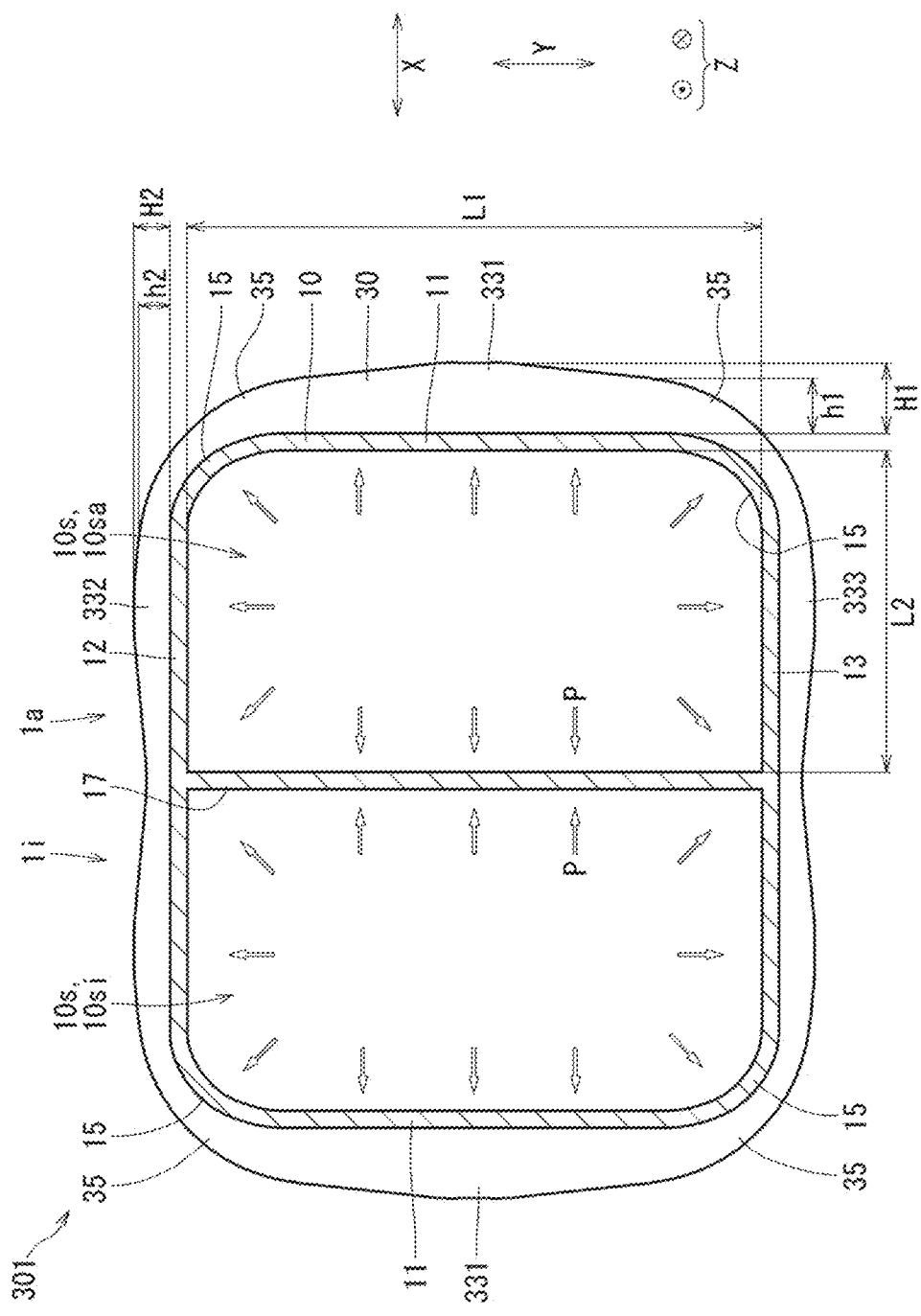
FIG. 10 is a diagram corresponding to FIG. 2 of the third embodiment.

With respect to the pressure vessel 301 of the third embodiment, the difference from the first embodiment is described by referring to FIG. 10. The difference resides in the shapes of the side surface rib 331, the top surface rib 332 and the bottom surface rib 333.

The side surface rib 331 is configured as follows. In the first embodiment, as illustrated in FIG. 2, the first projection amount h1 of the side surface rib 31 is constant irrespective of the position in the up-and-side direction Y. On the other hand, in this embodiment, as illustrated in FIG. 10, the first projection amount h1 of the side surface rib 331 differs depending on the position in the up-and-down direction Y. The first projection amount h1 is set to be large at an up-and-down direction Y position where the bending moment on the side surface 11 is large, and the first projection amount h1 is set to be small at an up-and-down direction Y position where the bending moment on the side surface 11 is small. The first projection amount h1 at a position overlapping with the up-and-down direction Y central part of the internal space 10s as viewed from the lateral direction X is larger than the first projection amount h1 at a position overlapping with a portion other than the up-and-down direction Y central part of the internal space 10s as viewed from the lateral direction X. Thanks to this configuration, the side surface rib 331 can be reduced in size, compared with a case where the first projection amount h1 is constant irrespective of the position in the up-and-down direction Y (see FIG. 2).

The top surface rib 332 is configured as follows. In the first embodiment, as illustrated in FIG. 2, the second projection amount h2 of the top surface rib 32 is constant irrespective of the position in the lateral direction X. On the other hand, in this embodiment, as illustrated in FIG. 10, the second projection amount h2 of the top surface rib 332 differs depending on the position in the lateral direction X. The second projection amount h2 is set to be large at a lateral direction X position Where the bending moment on the top surface 12 is large, and the second projection amount h2 is set to be small at a lateral direction X position where the bending moment on the top surface 12 is small. The second projection amount h2 at a position overlapping with the lateral direction X central part of the internal space 10s as viewed from the up-and-down direction Y is larger than the second projection amount h2 at a position overlapping with a portion other than the lateral direction X central part of the internal space 10s as viewed from the up-and-down direction Y. Thanks to this configuration, the top surface rib 332 can be reduced in size, compared with a case where the second projection amount h2 is constant irrespective of the position in the lateral direction X (see FIG. 2). The bottom surface rib 333 is provided symmetrically with the top surface rib 332 in the up-and-down direction Y.

Fourth Embodiment

Figure 11:
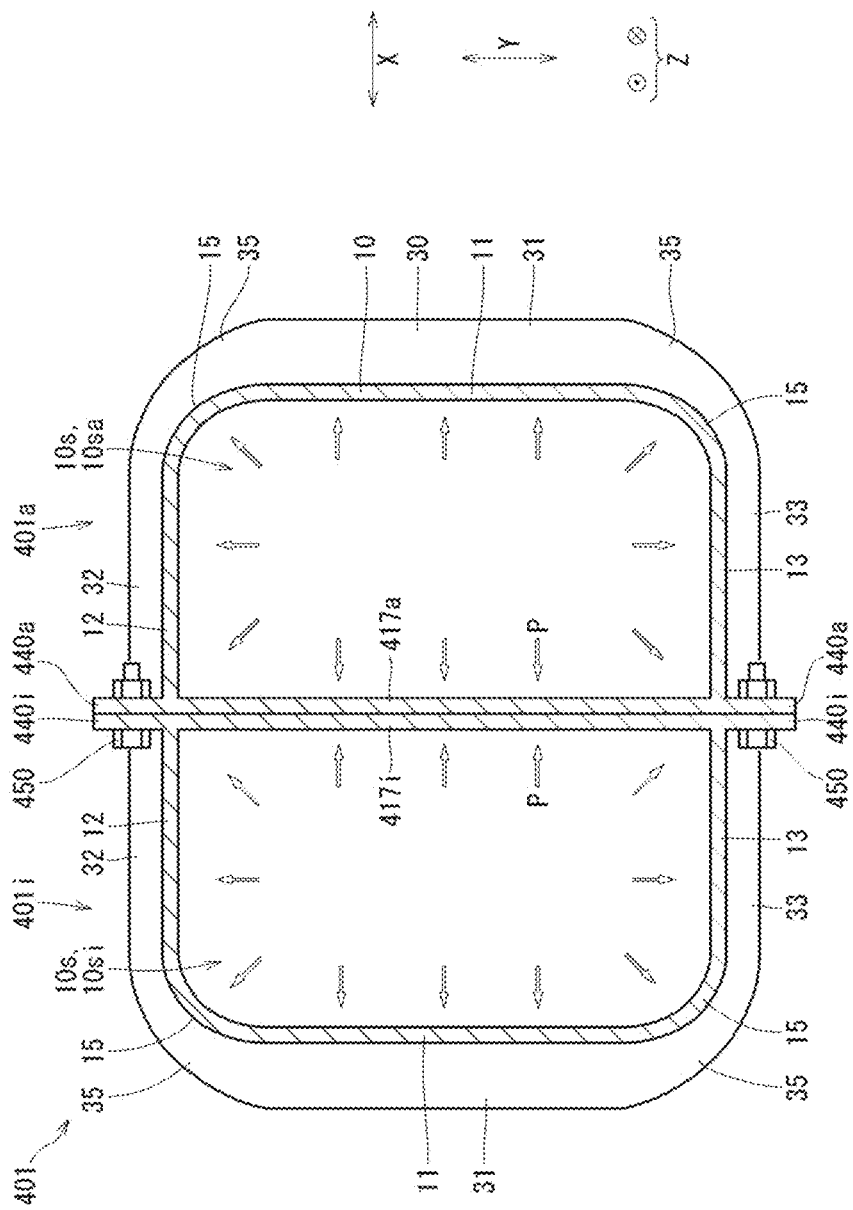
FIG. 11 is a diagram corresponding to FIG. 2 of the fourth embodiment.

With respect to the pressure vessel 401 of the fourth embodiment, the difference from the first embodiment is described by referring to FIG. 11. In the first embodiment, as illustrated in FIG. 2, the aftercooler 1a and the intercooler 1i are integrated. On the other hand, in this embodiment, the aftercooler 401a and the intercooler 401i are separate bodies.

The aftercooler 401a and the intercooler 401i are fixed (fastened, rigidly connected) by a fastening member 450 and arranged symmetrically in the lateral direction X. In the following, unless otherwise indicated, a state where the aftercooler 401a and the intercooler 401i are fixed is described. The top surface rib 32 of the aftercooler 401a and the top surface rib 32 of the intercooler 401i are separate bodies and arranged to continue in the lateral direction X (same applies to the bottom surface ribs 33). The aftercooler 401a includes a first partition 417a corresponding to the partition 17 of the first embodiment (see FIG. 2) and a first fastening member fitting part 440a. The intercooler 401i includes a second partition 417i corresponding to the partition 17 of the first embodiment and a second fastening member fitting part 440i.

The first partition 417a and the second partition 417i are arranged in parallel to each other and are in contact with one another. The first fastening member fitting part 440a projects from the connection position of the first partition 417a and the second surface (top surface 12 and bottom surface 13) to the outside of the vessel body 10 and also in the up-and-down direction Y. The second fastening member fitting part 440i projects from the connection position of the second partition 417i and the second surface (top surface 12 and bottom surface 13) to the outside of the vessel body 10 and also in the up-and-down direction Y.

The fastening member 450 fastens the first fastening member fitting part 440a and the second fastening member fitting part 440i and thereby fixes the aftercooler 401a and the intercooler 401i. The fastening member 450 is, for example, a bolt, etc.

MODIFICATION EXAMPLE

Each of the embodiments above may be variously modified. The number of constituent elements in each of the embodiments may be changed, or a part of the constituent elements may not be provided. In addition, the arrangements or shapes of the constituent elements may be modified. The pressure vessel 1 illustrated in FIG. 1 may not be used for a compressor or may not be a vessel for cooling a fluid. In the embodiments described above, the pressure vessel 1 includes two vessels (intercooler 1i and aftercooler 1a) but may include only one vessel or may include three or more vessels.

Constituent elements of the embodiments that are different from each other may be combined. The side surface rib 31 of the first embodiment illustrated in FIG. 2 may be replaced with the side surface rib 331 of the third embodiment illustrated in FIG. 10. The top surface rib 32 of the first embodiment illustrated in FIG. 2 may be replaced with the top surface rib 332 of the third embodiment illustrated in FIG. 10. For example, 5 sheets of the rib 30 are depicted in FIG. 1, but the number of sheets of the rib 30 may be changed.

The material constituting the pressure vessel 1 may not be cast iron. In the case where the variation in strength of the material constituting the pressure vessel 1 is equal to or smaller than the variation in strength of cast iron, at least either equation A1 or equation A2 may be satisfied.

As illustrated in FIG. 2, in the embodiments above, the width L2 of the internal space 10s in a direction perpendicular to the partition 17 (lateral direction X) is smaller than the width L1 of the internal space 10s in the extending direction of the partition 17 (up-and-down direction Y) in a cross-section as viewed from the vessel body axial direction Z. On the other hand, the width of the internal space 10s in a direction perpendicular to the partition 17 (lateral direction X) may be larger than the width of the internal space 10s in the extending direction of the partition 17 (up-and-down direction Y) in a cross-section as viewed from the vessel body axial direction Z. In the embodiments above, the partition 17 is arranged in a long-side portion of the nearly rectangular internal space 10s in a cross-section as viewed from the vessel body axial direction Z. On the other hand, the partition 17 may be arranged in a short-side portion of the internal space 10s in a cross-section as viewed from the vessel body axial direction Z.

This application is based on Japanese Patent Application (Patent Application No. 2017-2820) filed on Jan. 11, 2017, the contents of which are incorporated herein by way of reference.

REFERENCE SIGNS LIST 1, 201, 301, 401 Pressure vessel
10 Vessel body
10s Internal space 11 Side surface (first surface)
12 Top surface (second surface)
13 Bottom surface (second surface)
30 Rib
31, 231, 331 Side surface rib (first rib)
32, 332 Top surface rib (second rib)
33, 333 Bottom surface rib (second rib)
231a Thin-walled part
231b Thick-walled part
X Lateral direction (second direction)
Y Up-and-down direction (first direction)
Z Vessel body axial direction

The invention claimed is:

1. A pressure vessel comprising:
a vessel body capable of housing a fluid in its internal space, and
a rib projecting from the vessel body to the outside of the vessel body,
wherein the vessel body comprises:
a first surface which forms the internal space by extending in a vessel body axial direction that is an axial direction of the vessel body, and extending in a first direction that is a direction perpendicular to the vessel body axial direction, and
a second surface which is connected to the first surface and forms the internal space by extending in the vessel body axial direction and extending in a second direction that is a direction perpendicular to the vessel body axial direction and the first direction,
the rib comprises:
a first rib which projects in the second direction from the first surface and extends in the first direction, and a second rib which is provided in series with the first rib, projects in the first direction from the second surface, and extends in the second direction,
a width in the second direction of the internal space is smaller than a width in the first direction of the internal space, and
a projection amount of an uppermost surface of the second rib from the second surface to the outside of the vessel body in the first direction is smaller than a projection amount of an uppermost surface of the first rib from the first surface to the outside of the vessel body in the second direction.

2. The pressure vessel according to claim 1, satisfying $0.7 \cdot (L1/L2)^2 \leq H1/H2 \leq 1.3 \cdot (L1/L2)^2$,
wherein L1 is the width in the first direction of the internal space,
L2 is the width in the second direction of the internal space,
H1 is the projection amount of the uppermost surface of the first rib from the first surface to the outside of the vessel body in the second direction, and
H2 is the projection amount of the uppermost surface of the second rib from the second surface to the outside of the vessel body in the first direction.

3. The pressure vessel according to claim 1,
wherein a plurality of the ribs are provided at equal intervals in the vessel body axial direction, and
the pressure vessel satisfies $0.7 \cdot (L1/L2)^2 \leq Zp1/Zp2 \leq 1.3 \cdot (L1/L2)^2$, wherein
L1 is the width in the first direction of the internal space,
L2 is the width in the second direction of the internal space,
Zp1 is a plastic section modulus of a cross-section as viewed from the first direction, which is a cross-section of a repeating unit including the first surface and the first rib, and
Zp2 is a plastic section modulus of a cross-section as viewed from the second direction, which is a cross-section of a repeating unit including the second surface and the second rib.

4. The pressure vessel according to claim 1, wherein a thickness in a first direction central part of the first rib is larger than a thickness in a portion other than the first direction central part of the first rib.

5. The pressure vessel according to claim 3, wherein a thickness in a first direction central part of the first rib is larger than a thickness in a portion other than the first direction central part of the first rib.

6. The pressure vessel according to claim 2, wherein a thickness in a first direction central part of the first rib is larger than a thickness in a portion other than the first direction central part of the first rib.

7. The pressure vessel according to claim 1, wherein the first rib includes a thin-walled part and a thick-wall part wherein with the thick-wall part has a thickness along the axial direction of the vessel body greater than a thickness of the thin-walled part along the axial direction of the vessel body.

8. The pressure vessel according to claim 7, wherein the thick-walled part is provided in a central part of the first rib along the first direction in such a manner that the thickness increases gradually toward the center of the first rib along the first direction.

* * * * *